Patented Nov. 3, 1942

2,300,944

UNITED STATES PATENT OFFICE 2,300,944

PROCESS OF ALLOYING TUNGSTEN WITH FERROUS METALS

Arthur Linz, New York, N. Y., assignor to Climax Molybdenum Company, New York, N. Y., a corporation of Delaware No Drawing. Application April 7, 1941, Serial No. 387,287

2 Claims. (Cl. 75—133)

The present invention relates to new and useful process of producing tungsten containing ferrous alloys.

Objects and advantages of the invention will be set forth in part hereinafter and in part will be obvious herefrom, or may be learned by practice with the invention, the same being realized and attained by means of the compositions, steps, processes and instrumentalities pointed out in the appended claims.

The invention consists in the novel compositions, steps, processes, combinations and improvements herein shown and described.

In my prior British Patent No. 513,853 I have disclosed the processes of producing tungsten containing ferrous alloys by the use of briquettes composed of tungsten trioxide and still pitch.

The present invention provides an improvement on my prior patent under certain conditions of operation and for certain purposes and it is an object of my present invention to provide tungsten containing briquettes for the production of ferrous alloys which are reduced and dissolved even more readily than those of my prior patents and which give an even higher recovery of tungsten in the presence of certain elements. A further object of the invention is the provision of an improved process for the production of ferrous alloys containing tungsten and, if desired, other alloying agents with substantially complete recovery of the alloying agent and with increased speed.

In accordance with the present invention there are provided briquettes comprising an intimate mixture of an oxide of tungsten and a plurality of reducing agents, preferably carbon and one or more of the following: aluminium, magnesium, calcium and silicon. These briquettes are highly compressed, not only to increase their specific gravity but also to render them more highly reactive. These briquettes are added to the molten metal in the ladle or to the charge in the furnace in the desired quantity and are quickly reduced by the heat so as to liberate the tungsten and allow it to dissolve in the ferrous alloy.

Referring now in detail to the present preferred examples of the invention, the briquettes are formed of tungstic trioxide, although the other oxides of tungsten may be used, intimately mixed with still pitch, preferably not in excess of 10% and up to 10% of one or more active reducing agents, such as aluminium, magnesium, calcium or silicon, the mixture being formed into uniform briquettes by powerful hydraulic or other pressure to give dense, compact briquettes with the various substances in as intimate contact as possible.

The required quantity of the tungsten, in the form of these briquettes, is added to the molten ferrous metal in the ladle, or they may be charged to the furnace, and the heat of the metal quickly causes the carbon and the more active reducing agents to reduce the tungstic oxide to metallic tungsten which is absorbed in the molten metal.

The more active reducing agents shorten the time required to complete the reaction and absorption of the tungsten into the ferrous metal, as might be expected, and also give a more complete recovery of the tungsten. Further, they effect further economies in alloy production, when chromium or vanadium are present in the alloy as they avoid the necessity for the separate or later addition of ferro-silicon and also prevent any substantial loss of the chromium or vanadium which might otherwise occur. Thus, the reduction of the briquettes when accomplished in part by reducing agents more active than carbon, and in part by carbon, does not interfere with the retention by the alloy of its chromium and vanadium content.

As specific examples of briquettes in accordance with the present invention, the following are given:

| | Parts |
|---|---|
| Tungstic trioxide | 100 |
| Still pitch or other carbonaceous binder | 5 to 10 |
| Aluminium powder | 2 to 8 |

The aluminium may be replaced in whole or in part by up to 5 or 6 parts silicon metal, up to 8 or 9 parts magnesium or up to 12 parts of calcium metal, or by mixtures of these metals.

The invention in its broader aspects is not limited to the specific compositions, processes and steps described and departures may be made therefrom within the scope of the accompanying claims without departing from the principles of the invention and without sacrificing its chief advantages.

What I claim is:

1. A process for alloying tungsten with ferrous metals containing elements of the class consisting of chromium and vanadium which includes adding briquettes of an oxide of tungsten intimately mixed with a carbonaceous binder and a more active reducing agent.

2. A process for alloying tungsten with ferrous metals containing elements of the class consisting of chromium and vanadium which includes adding briquettes of an oxide of tungsten intimately mixed with a carbonaceous binder and a more active reducing agent selected from the group consisting of aluminium, silicon, calcium and magnesium, in an amount sufficient to reduce the tungsten.

ARTHUR LINZ.